May 19, 1964  R. L. VAN ANTWERP ETAL  3,133,449
IDLER WHEEL FOR VARIABLE SPEED RECORD TURNTABLE DRIVE
Filed July 31, 1961
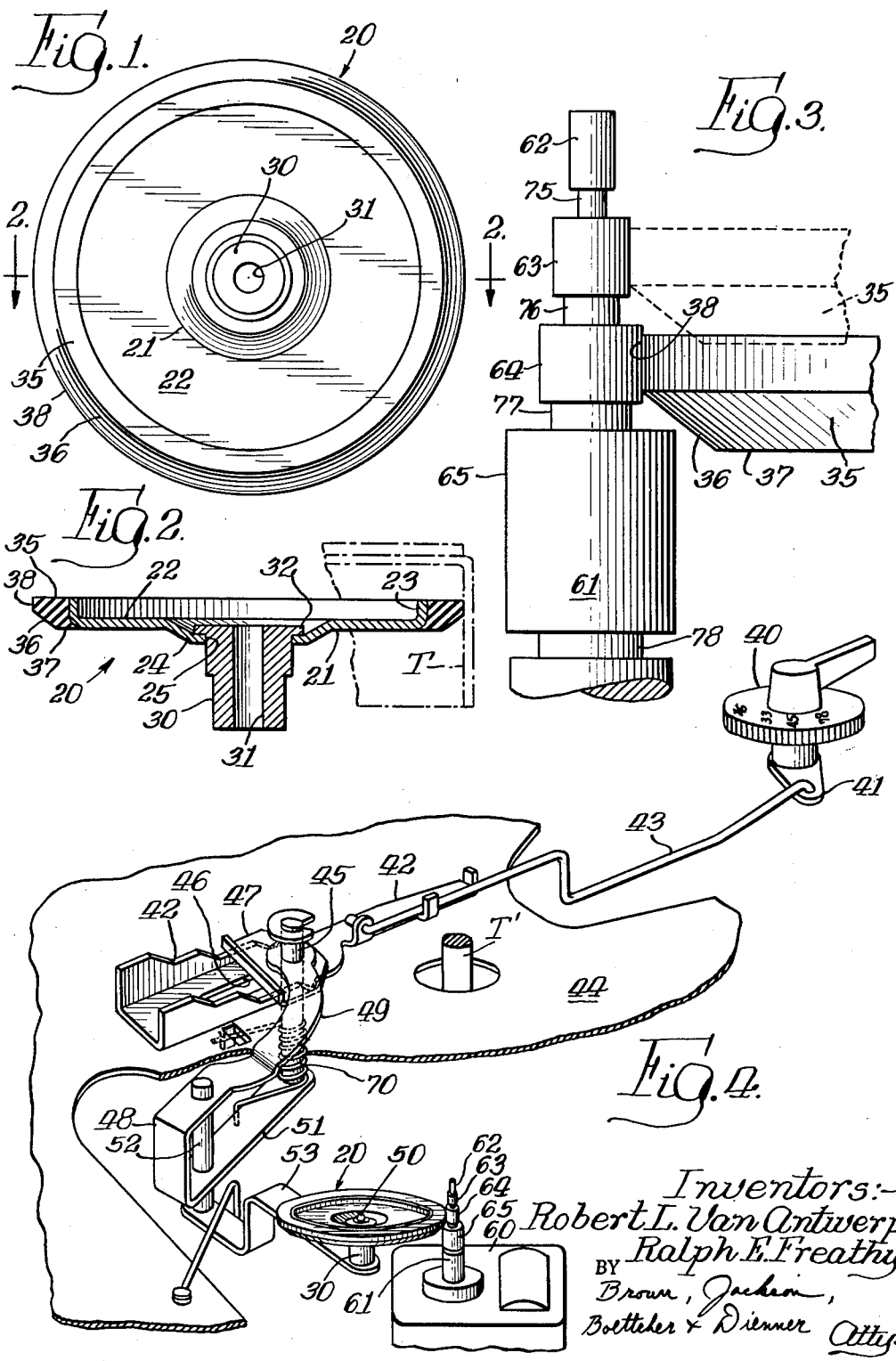
Inventors:—
Robert L. Van Antwerp,
Ralph E. Freathy,
BY Brown, Jackson,
Boettcher & Dienner  Atty's

United States Patent Office 3,133,449
Patented May 19, 1964

3,133,449
IDLER WHEEL FOR VARIABLE SPEED RECORD TURNTABLE DRIVE
Robert L. Van Antwerp, Benton Harbor, and Ralph E. Freathy, Stevensville, Mich., assignors to V-M Corporation, Benton Harbor, Mich., a corporation of Michigan
Filed July 31, 1961, Ser. No. 127,953
5 Claims. (Cl. 74—216)

This invention relates to a variable speed record turntable drive of the type having a motor driven stepped pulley and speed changing mechanism for moving an idler wheel axially into simultaneous engagement with a selected one of a plurality of steps on the pulley and with a phonograph turntable to drive the latter at a predetermined speed.

More specifically, the invention relates to an idler wheel for such a turntable drive having a circumferential bevel disposed toward the larger steps on the drive pulley to provide a relatively thin and resilient radially outer portion for engagement with the pulley and a relatively thick radially inner supporting portion.

Phonograph turntable drives are normally of the multispeed type to permit playing of various types of records adapted to be reproduced at different speeds. One known speed changing mechanism comprises a stepped drive pulley and means for moving an idler wheel into engagement with one of a plurality of steps on the pulley and with a circumferential rim on the phonograph turntable to drive the latter at a predetermined speed corresponding to the diameter of the step on the pulley from which the idler wheel is being driven. Consequently, the speed at which the turntable is driven may be varied by moving the idler wheel axially into engagement with a different step on the pulley having a larger or smaller diameter, depending upon whether speed is to be increased or decreased.

Idler wheels of the character noted commonly comprise a metal hub encircled by a rubber tire member, the latter being adapted to engage the drive pulley and the turntable to be driven. Heretofore, such idler wheel tires have, in accordance with one known embodiment, comprised flat annular members, rectangular in cross-sectional configuration. The principal factor in determining the thickness of such tires has been the need to provide a tire possessing sufficient stability and resistance to wear that it will withstand long use without undue deformation or deterioration.

During the change cycle the idler wheel must, by rotating the turntable, drive mechanism for shifting the position of a tone arm, dropping a new record to the turntable, etc., and during this time the driving torque which the idler wheel must transmit is several times that developed during reproduction of a recording. Thus, the thickness and other physical characteristics of an idler wheel tire must be such that it can withstand the torque developed during the change cycle for many repeated cycles of use without flaking apart or otherwise becoming defective.

One object of the present invention is to provide an idler wheel comprising a hub encircled by a rubber tire wherein the radially inner portion of the tire is sufficiently thick and rigid to provide the necessary stability, while the radially outer portion is beveled to provide a relatively thin and resilient peripheral rim adapted to engage a stepped drive pulley.

We have found that the use of a beveled tire as last above-mentioned provides several significant advantages, one of which is the reduction of the undesirable audible effect commonly known as rumble. Any imperfection in the balance of a phonograph motor will cause the stepped motor pulley to vibrate or oscillate slightly in a radial or transverse direction, and to the extent that such oscillations are transferred from the idler wheel to the turntable and thence to the record being reproduced, a corresponding amount of rumble will be produced.

In order to effect satisfactory sound reproduction, rumble must be carefully controlled. This is normally accomplished by employing a drive motor which is so accurately balanced that the oscillation of the stepped pulley will not be sufficient to cause appreciable rumble. While rumble can normally be satisfactorily controlled in this manner, the necessary precision in the manufacture of the drive motor substantially increases its cost and thus that of the phonograph of which it is a part.

We have found that by beveling the radially outer portion of the idler wheel tire to provide a relatively thin and resilient peripheral rim portion for engagement with the stepped motor pulley, the ability of the tire to absorb vibrations or oscillations of the pulley can be substantially increased, without appreciably impairing the stability of the tire.

In other words, where the outer peripheral edge portion of the tire is relatively thin, it can be more readily compressed radially or caused to bulge, whereby it will absorb more of the vibrations from the stepped pulley rather than transfer them to the turntable. Since it is only the outer edge portion of the tire that is of such reduced thickness, the ability of the tire to withstand the torque developed during the change cycle is not appreciably affected. An idler wheel of this type has been found to substantially reduce rumble and permit the use of a less expensive phonograph drive motor.

In accordance with the present invention, it is essential that the beveled side of the idler wheel be disposed toward the larger steps on the drive pulley, whereby a very important advantage over the prior art devices is effected. It has been stated above that in order to increase speed in variable speed turntable drives of the type with which this invention is concerned, the idler wheel is moved axially with respect to a stepped pulley so as to engage a larger step on the pulley. In many of the known devices of this type, mechanism is provided for disengaging the idler wheel from the pulley when increasing speed, so as to enable the idler wheel to be moved from a smaller step to a larger one without binding on the side or corner of the latter. The beveled idler wheel of the present invention facilitates movement of the idler wheel to engagement with a larger step on the pulley, and permits speed to be increased without disengaging the idler wheel and the pulley.

In other words, the circumferential bevel is formed so that when it comes into contact with a corner on the motor pulley, the forces developed cause the idler wheel to move first radially or laterally, and then axially to the next pulley diameter. The mechanism for shifting to a higher speed need comprise only means for applying an axial force to the idler wheel, as for example a compression spring.

Another important advantage in providing an idler wheel having a relatively thin outer rim portion for engaging the motor pulley is that it permits reduction of the axial length of the various steps on the pulley, and thus reduces the distance which the idler wheel must be shifted in order to change speed.

It should be understood that while it would be possible to facilitate shifting to a higher speed by providing tapered or conical sections between each of the steps on the motor pulley, this would require lengthening the pulley rather than permit a reduction in length. In addition, it would as a practical matter be relatively difficult and expensive to manufacture a pulley having such conical sections, and would of course have no mitigative effect on rumble.

The above and other objects and advantages of the invention will be apparent from the following description of a preferred embodiment, taken in conjunction with the accompanying drawings in which:

FIGURE 1 is a bottom plan view of an idler wheel constructed in accordance with the invention;

FIGURE 2 is a sectional view of the idler wheel taken along the line 2—2 of FIGURE 1 and further shows in dot-dash lines a fragmentary portion of the peripheral rim of a phonograph turntable being driven by the idler wheel;

FIGURE 3 is an enlarged fragmentary elevational view illustrating the manner in which the idler wheel engages a stepped motor pulley to be driven thereby; and FIGURE 4 is a perspective view illustrating speed changing mechanism for shifting an idler wheel axially from one step on a motor pulley to another step thereon.

Referring now to the drawings, FIGURES 1 and 2 show an idler wheel, indicated generally as 20, which is constructed in accordance with the invention. The idler wheel 20 includes a hub member 21 comprising an annular disc 22 bent upwardly at its periphery to form a circumferential flange 23 and offset downwardly at its radially inner portion 24, the latter being apertured to provide a concentric circular opening 25. The hub 21 is preferably made of metal, but various other materials may be employed if desired.

A bearing 30, made of bronze or other suitable bearing material, is secured to the hub 21 and serves as a means for mounting the idler wheel on speed changing mechanism, as will be described more fully hereinafter. The bearing is generally tubular in configuration having an opening 31 extending throughout its length whereby the idler wheel may be rotatably mounted on a supporting spindle such as the spindle 50 in FIGURE 4.

The bearing 30 is received within the hub opening 25 and has an integral circumferential flange 32 at its upper end which bears downwardly against the inner peripheral edge of the disc 22. The bearing is secured to the disc by any suitable fastening means. For example, a lock washer (not shown) may be pressed upwardly over the outer diameter of the bearing to engage the underside of the inner peripheral edge of the disc.

An important aspect of the invention resides in the provision of a beveled annular tire member 35 which is secured by any suitable means to the outer circumferential rim or flange 23 of the hub 21 so as to encircle the same. The tire 35 is preferably made of a resilient material such as natural or synthetic rubber, and in accordance with the invention has a circumferential bevel 36 at its underside to provide a relatively thin, resilient, more readily compressible, radially outer portion and a relatively thick radially inner supporting portion. It will be seen from FIGURES 2 and 3 that the thickness of the tire at its radially inner portion at 37 is approximately twice the thickness of the tire at its outer peripheral rim 38.

Reference is now made to FIGURE 4 which illustrates somewhat schematically an example of a speed changing mechanism of the type with which the idler wheel 20 is adapted to be used. Such mechanism comprises a manually operable knob 40 having a crank 41, the latter being connected to a stepped cam slide 42 by means of a rod 43. A base plate of a phonograph in which the speed mechanism is embodied is shown at 44. A spindle or mounting rod 45 is fixed to the base plate 44 so as to project above and below said plate, the upper portion of the rod 45 extending through a longitudinal slot 46 in the cam slide 42 so as to serve as a guide for the latter.

A bearing plate 47 is mounted on the rod 45 so as to overlie the stepped portion of the slide 42. A yoke member 48 has an upper arm 49 which is disposed above the base plate 44 and rotatably mounted on the rod 45 so as to overlie the bearing plate 47, and a lower arm 51 disposed below the base plate. A second rod or spindle 52 is mounted on the arms 49 and 51 and carries on its lower end an idler wheel supporting arm 53, the idler wheel 20 being rotatably mounted on the arm 53 by means of a pin 50 which is accommodated within the tubular bearing 30.

A phonograph drive motor 60 is provided with a stepped drive pulley 61 having a plurality of steps 62, 63, 64 and 65, the idler wheel 20 being shown in operative position in engagement with the step 64 of the pulley so as to be driven thereby at a speed corresponding to the diameter of that step.

It will now be understood that rotation of the manually operable knob 40 in a counterclockwise direction will cause the cam slide 42 to be pulley under the bearing plate 47 and upper yoke arm 49 so as to lift the yoke 48 and move the idler wheel upwardly. In this manner, the idler wheel may be moved into engagement with a smaller diameter step on the pulley 61 whereby the idler wheel and a turntable driven thereby will be rotated at a correspondingly reduced speed. Rotation of the knob 40 in the opposite direction will permit the yoke 48 to be moved downwardly by a compression spring 70 which is disposed between the underside of the base plate 44 and the lower yoke arm 51 so as to bias the yoke 48 downwardly, and in this manner the idler wheel may be moved into engagement with a larger diameter step on the pulley 61 so as to increase speed. The outer rim 38 of the idler wheel is adapted to engage the inner surface of a peripheral flange T on the phonograph turntable (see FIGURE 2) to drive the latter, and thus the speed of rotation of the turntable may be varied by rotation of the control knob 40. A turntable spindle is indicated at T' in FIGURE 4.

Reference is now made to FIGURE 3 which is a substantially enlarged view showing the outer peripheral rim 38 of the idler wheel in engagement with the step 64 of the pulley 61. It will be seen that the smallest step 62 is at the upper end of the pulley and moving downwardly the steps increase in diameter with the lowest step 65 having the largest diameter. These steps are accurately ground so that based upon the known speed of the motor 60 they correspond to certain standard phonograph speeds, as for example 16 r.p.m., 33⅓ r.p.m., 45 r.p.m. and 78 r.p.m. Undercut portions 75, 76, 77 and 78 are provided between the respective steps in order to provide clearance for a grinding wheel and otherwise facilitate the finishing operation, and for the further reason that if the idler wheel is slightly misaligned so that the rim 38 extends axially over the edge of the step from which it is being driven, it will not engage the corner or edge of another larger step such as would impair its operation.

It will be seen from FIGURE 3 that while the tire 35 at the radially inner portion 37 is relatively thick so as to provide the necessary stability during the change cycle and otherwise, the circumferential taper 36 terminates in a relatively thin rim at 38 which is adapted to engage the pulley. The thickness of the radially inner portion 37 is preferably approximately twice that of the thickness at the rim 38.

It is believed to be clear that by providing a rim portion of reduced thickness, the resiliency and more ready compressibility of the tire in the immediate area of engagement with the drive pulley is increased. It has been found that by so beveling the idler wheel tire the ability of the latter to absorb vibrations of the pulley and thus reduce rumble is improved significantly. It has further been found that such an advantage can be accomplished without appreciably impairing the stability of the tire, as would occur if the entire tire were made thinner rather than beveled.

However, a further and perhaps more important aspect of the invention resides in the fact that the beveled side of the idler wheel tire is disposed toward the larger diameter steps on the pulley. When the tire 35 is so disposed the operation necessary to increase speed is substantially facilitated. In other words, the mechanism for shifting the idler wheel for engagement with a larger diameter step on the pulley 61 need only apply an axial force to the idler wheel, e.g. the downward force applied by the compression spring 70. The forces developed between the circumferential taper 36 and the corner of the next larger step will cause the idler wheel to move first radially or laterally, and then axially down into engagement with a step of larger diameter.

The angle defined between the beveled portion 36 and the plane of the idler wheel 20 is preferably approximately 45 degrees. However, it may be desirable to reduce this angle somewhat for purposes of providing necessary clearances. In other words, when the idler wheel tire is being driven from the step 64, as shown in FIGURE 3, it is necessary that there be some clearance between the beveled portion 36 of the tire and the adjacent corner of the next larger step 65. The optimum angle between the bevel 36 and the plane of the idler wheel depends in each case on the exact dimensions of the pulley and the idler wheel tire, but it has been found desirable to maintain this angle between approximately 30 and 45 degrees.

While we have illustrated our invention in a preferred form, we do not intend to be limited to that form, except insofar as the appended claims are so limited, since modifications coming within the scope of the invention will be readily suggested to others with our disclosure before them.

We claim:

1. In a variable speed record turntable drive of the type having a motor driven stepped driving pulley and speed changing mechanism for moving an idler wheel axially into simultaneous engagement with a selected one of a plurality of steps on said pulley and with a phonograph turntable to drive the latter at a predetermined speed, the improvement comprising an idler wheel including a hub member, a bearing member secured to said hub for mounting the same on said speed changing mechanism, and an annular tire secured at the rim of said hub, said tire having a circumferential bevel disposed toward the larger steps on said pulley to facilitate operation of said speed changing mechanism to increase speed and to provide a relatively thin and resilient radially outer portion for engagement with said pulley and a relatively thick radially inner supporting portion adjacent said hub rim, said bevel being formed at an angle of between approximately 30 degrees and 45 degrees with respect to the plane of said idler wheel.

2. The invention of claim 1 wherein the axial thickness of said tire at its radially outer peripheral edge is approximately one half the thickness of said tire at its radially inner portion adjacent said hub rim.

3. In a variable speed record turntable drive of the type having a motor driven stepped driving pulley and speed changing mechanism for moving an idler wheel axially into simultaneous engagement with a selected one of a plurality of steps on said pulley and with a phonograph turntable to drive the latter at a predetermined speed, the improvement comprising an idler wheel including a hub member, a bearing member secured to said hub for mounting the same on said speed changing mechanism, and an annular rubber tire secured at the rim of said hub, said tire having a circumferential bevel disposed toward the larger steps on said pulley and defining an angle of between approximately 30 degrees and 45 degrees with respect to the plane of said idler wheel to facilitate operation of said speed changing mechanism to increase speed and to provide a relatively thin and resilient radially outer portion for engagement with said pulley and a radially inner supporting portion of approximately twice the thickness of said outer portion.

4. In a variable speed record turntable drive of the type having a motor driven stepped driving pulley and speed changing mechanism for moving an idler wheel axially into simultaneous engagement with a selected one of a plurality of steps on said pulley and with a phonograph turntable to drive the latter at a predetermined speed, the improvement comprising an idler wheel, and means for mounting the same on said speed changing mechanism, said idler wheel comprising a peripheral portion having a circumferential bevel disposed toward the larger steps on said pulley and defining an angle of between approximately 30 degrees and 45 degrees with respect to the plane of said idler wheel to facilitate operation of said speed changing mechanism to increase speed and to provide a relatively thin and resilient radially outer portion for engagement with said pulley and a relatively thick radially inner supporting portion.

5. In a variable speed record turntable drive of the type having a motor-driven stepped driving pulley and speed changing mechanism for moving an idler wheel axially into simultaneous engagement with a selected one of a plurality of steps on said pulley and with a phonograph turntable to drive the latter at a predetermined speed, the improvement comprising an idler wheel, means for mounting the same on said speed changing mechanism, and an annular rubber tire secured at the rim of said wheel, said tire having a circumferential bevel disposed toward the larger steps on said pulley and defining an angle of approximately 45 degrees with respect to the plane of said idler wheel to facilitate operation of said speed changing mechanism to increase speed, and to provide a relatively thin and resilient radially outer portion for engagement with said pulley and a radially inner supporting portion of approximately twice the thickness of said outer portion.

References Cited in the file of this patent

UNITED STATES PATENTS

| | | |
|---|---|---|
| 2,915,907 | Giskes | Dec. 8, 1959 |
| 2,925,738 | Coven et al. | Feb. 23, 1960 |
| 2,951,385 | Deming et al. | Sept. 6, 1960 |